United States Patent Office 3,203,927
Patented Aug. 31, 1965

3,203,927
POLYMERIC ORGANOBORON COMPOUNDS
Kiyoshi Kitasaki, Garden Grove, and George W. Willcockson, Anaheim, Calif., assignors to United States Borax & Chemical Corporation, Los Angeles, Calif., a corporation of Nevada
No Drawing. Filed Dec. 4, 1961, Ser. No. 156,933
12 Claims. (Cl. 260—47)

The present invention relates as indicated to a new class of polymeric organoboron compounds and has further reference to a method for preparing these polymeric compounds.

It is, therefore, the principal object of the present invention to provide a new class of thermally stable polymeric organoboron compounds.

It is a further object of this invention to provide an efficient means for preparing these new thermally stable polymeric organoboron compounds.

Other objects of the present invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises polymeric organoboron compounds having the recurring structural unit

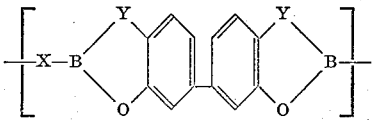

where X is a radical selected from the group consisting of 1,3-phenylene and 1,4-phenylene and Y is selected from the group consisting of imino and oxygen radicals.

The organoboron polymers of the present invention find utility as binders in laminate compositions. They exhibit a high degree of thermal stability at temperatures of over 500° C. and they have many industrial applications, for example, as coatings for different types of wire and glass-cloth, which are to be subjected to high temperature environments.

The preparation of the present polymeric organoboron compounds can best be illustrated by the following equation:

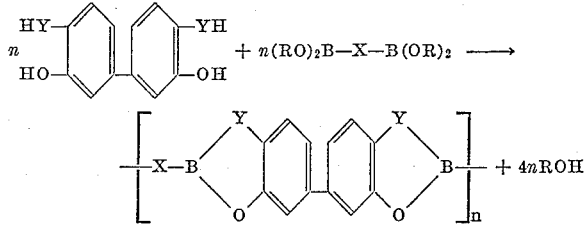

where X is a radical selected from the group consisting of 1,3-phenylene and 1,4-phenylene, Y is selected from the group consisting of imino and oxygen radicals and R is either phenyl or a lower alkyl radical.

The preferred method for performing the above polymerization reaction is a direct single-step process. Equimolar amounts of the reactants are added together, either alone or in the presence of a heat transfer medium, and the reaction mass is heated until the theoretical amount of alcohol produced by the reaction is removed. The desired polymeric organoboron compound is then recovered from the residual reaction mixture as an infusible solid.

For the sake of speed of reaction and ease of recovery in the preferred embodiment of the invention we heat the reactants together in the presence of a heat transfer medium. The common hydrocarbon, ethereal and liquid amide solvents such as benzene, toluene, n-heptane, chlorobenzene, veratrole, di-n-butyl ether, diglyme, triglyme, N-methyl pyrrolidinone, dimethylacetamide, etc. are all applicable to the present invention. The only requirement which determines which material can be used as the heat transfer medium is that the material must be inert to the reactants, and preferably they will have a boiling point greater than that of the alcohol produced during the polymerization reaction.

The first reactant applicable to the present invention, as shown in the foregoing equation, has the formula

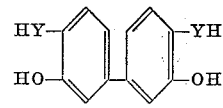

where Y is either an imino (NH) group or oxygen. Thus, when Y is an imino group the reactant is 4,4'-diamino-3,3'-dihydroxydiphenyl, and when Y is oxygen the reactant is 3,4,3',4'-tetrahydroxydiphenyl. Both of these compounds are known in the art, and reference to the preparation of 4,4'-diamino-3,3'-dihydroxydiphenyl will be found in "Journal of the Chemical Society," 1929, page 151, while reference to the preparation of 3,4,3',4'-tetrahydroxydiphenyl will be found in "Monatsh," 1930, vol. 55, page 347.

The second group of reactants necessary for preparing the polymeric organoboron compounds of the present invention have the formula

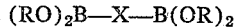

$(RO)_2B$—$X$—$B(OR)_2$ where X is either a 1,3-phenylene radical or a 1,4-phenylene radical, and R is either a lower alkyl radical or a phenyl radical. The preparation of phenyldiboronic acid esters, has been described in "Journal of the American Chemical Society," 1957, vol. 79, page 3081.

The following list is illustrative of the phenyldiboronic acid esters applicable to the present invention:

1,4-bis-(dimethoxyboryl)benzene
1,3-bis(diethoxyboryl)benzene
1,4-bis(di-n-propoxyboryl)benzene
1,3-bis(diisopropoxyboryl)benzene
1,4-bis-(di-n-butoxyboryl)benzene
1,3 bis(diisopentoxyboryl)benzene
1,4-bis(di-n-hexoxyboryl)benzene
1,4-bis(diphenoxyboryl)benzene
1,3-bis(diphenoxyboryl)benzene It is to be clearly understood that the foregoing list is only a partial enumeration of the phenyldiboronic acid esters applicable to the present invention and is not intended to limit the invention.

So that the present invention can be more clearly understood the following examples are given for illustrative purposes:

I. A solution of 3.90 grams (0.01 mole) of 1,4-bis(di-n-butoxyboryl)benzene in 10 ml. of chlorobenzene was added to a slurry of 2.16 grams (0.01 mole) of 4,4'-diamino-3,3'-dihydroxydiphenyl in 50 ml. of chlorobenzene. The reaction mixture was stirred and heated at reflux for a period of about 7.5 hours at which time the theoretical amount, 2.96 grams, of butanol had been removed. The insoluble reaction product was then recovered from the residual slurry by filtration and was dried in vacuum at about 100° C. for 2 hours. The dry product, when placed in a sealed tube, remained unaffected when heated at temperatures up to about 510° C. Chemical analysis of the product yielded the following data.

Calculated for $C_{18}H_{12}B_2N_2O_2$: B=6.98%. Found in in product: B=6.34%.

II. A solution of 4.70 grams (0.01 mole) of 1,4,bis(diphenoxyboryl)benzene in 20 ml. of tetraglyme (tetraethylene-glycol dimethyl ether), was added to 2.18 grams 0.01 mole) of 3,4,3',4'-tetrahydroxydiphenyl in 50 ml. of tetraglyme. The reaction mixture was stirred and heated at reflux for a period of about 8 hours, at which time the theoretical amount, 3.76 grams, of phenol had been removed. The insoluble reaction product was then recovered from the residual slurry by filtration, and was dried in vacuum at about 250° C. for about 6 hours. The dry product, when placed in a sealed tube, remained unaffected when heated at temperatures up to about 530° C. Chemical analysis of the product yielded the following data.

Calculated for $C_{18}H_{10}B_2O_4$: B=6.94%. Found in product: B=6.49%.

III. A solution of 7.80 grams (0.02 mole) of 1,4-bis(di-n-butxoyboryl)benzene in 50 ml. of veratrole, (1,2-dimethoxybenzene) was added to 4.36 grams (0.02 mole) of 3,4,3',4'-tetrahydroxydiphenyl in 100 ml. of veratrole. The reaction mixture was stirred and heated at reflux for a period of about 6.5 hours, at which time the theoretical amount, 5.93 grams, of butanol had been removed. The insoluble reaction product was then recovered from the residual slurry by filtration and was dried in vacuum at about 250° C. for about 6 hours. The dry product, when placed in a sealed tube remained unaffected when heated at temperatures up to about 535° C. Chemical analysis of the product yielded the following data.

Calculated for $C_{18}H_{10}B_2O_4$: B=6.94%. Found in product: B=6.54%.

IV. A solution of 5.56 grams (0.02 mole) of 1,3-bis-(diethoxyboryl)benzene in 20 ml. of diglyme (diethyleneglycol dimethyl ether), was added to 4.36 grams (0.02 mole) of 3,4,3',4'-tetrahydroxydiphenyl in 40 ml. of diglyme. The reaction mixture was stirred and heated at reflux for a period of about 6 hours, at which time the theoretical amount, 3.68 grams, of ethanol had been removed. The insoluble reaction product was then recovered from the residual slurry by filtration and was dried in vacuum at about 200° C. for 2 hours. The dry product, when placed in a sealed tube, remained unaffected when heated at temperatures up to about 530° C. Chemical analysis of the product yielded the following data.

Calculated for $C_{18}H_{10}B_2O_4$: B=6.94%. Found in product: B=6.62%.

V. A solution of 6.40 grams (0.02 mole) of 1,3-bis-(diisopropoxyboryl)benzene in 30 ml. of chlorobenzene was added to a slurry of 4.32 grams (0.02 mole) of 4,4'-diamino-3,3'-dihydroxydiphenyl in 50 ml. of chlorobenzene. The reaction mixture was stirred and heated at reflux for a period of about 8 hours, at which time the theoretical amount, 4.80 grams, of isopropanol had been removed. The insoluble reaction product was then recovered from the residual slurry by filtration and was dried in vacuum at about 100° C. for 3 hours. The dry product, when placed in a sealed tube, remained unaffected when heated at temperatures up to about 530° C. Chemical analysis of the product yielded the following data.

Calculated for $C_{18}H_{12}B_2N_2O_2$: B=6.98%. Found in product: B=6.44%.

VI. 1,4-bis(di-n-butoxyboryl)benzene 7.8 grams (0.02 mole) was added to 4.36 grams (0.02 mole) of 3,4,3',4'-tetrahydroxydiphenyl and the reaction mixture heated to about 250–260° C. with agitation until the theoretical amount, 5.93 grams, of butanol had been removed. The reaction product was heated in vacuum at about 250° C. for about 6 hours. The dry product when placed in a sealed tube remained unaffected when heated at temperatures up to about 530° C. Chemical analysis of the product yielded the following data.

Calculated for $C_{18}H_{10}B_2O_4$: B=6.94%. Found in product: B=6.76%.

Other modes of applying the principle of the invention may be employed, change being made as regards the details described, provided the features as stated in any of the following claims or the equivalent of such be employed.

We, therefore, particularly point out and distinctly claim as our invention:

1. Polymeric organoboron compounds of the recurring structural unit

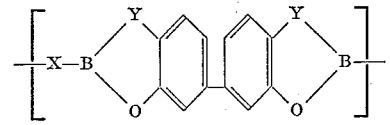

said units being linked through boron-carbon bonds of which said carbon atom is a nuclear carbon of a phenylene radical, where X is a radical selected from the group consisting of 1,3-phenylene and 1,4-phenylene and Y is selected from the group consisting of imino and oxygen radicals.

2. A polymeric organoboron compound of the recurring structural unit

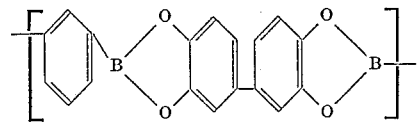

said units being linked through boron-carbon bonds of which said carbon atom is a nuclear carbon of a phenylene radical.

3. A polymeric organoboron compound of the recurring structural unit

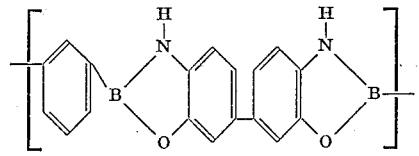

said units being linked through boron-carbon bonds of which said carbon atom is a nuclear carbon of a phenylene radical.

4. A polymeric organoboron compound of the recurring structural unit

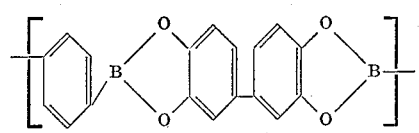

said units being linked through boron-carbon bonds of which said carbon atom is a nuclear carbon of a phenylene radical.

5. A polymeric organoboron compound of the recurring structural unit

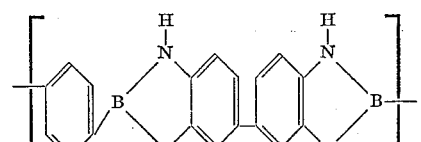

said units being linked through boron-carbon bonds of which said carbon atom is a nuclear carbon of a phenylene radical.

6. The method for preparing polymeric organoboron compounds of the recurring structural unit

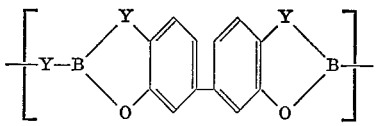

said units being linked through boron-carbon bonds of which said carbon atom is a nuclear carbon of a phenylene radical, where X is a radical selected from the group consisting of 1,3-phenylene and 1,4-phenylene and Y is selected from the group consisting of imino and oxygen radicals which comprises heating a material selected from the group consisting of 4,4'-diamino-3,3'-dihydroxydiphenyl and 3,4,3',4'-tetrahydroxydiphenyl with a material selected from the group consisting of 1,3-phenyldiboronic acid esters and 1,4-phenyldiboronic acid esters and removing the alcohol produced in the reaction.

7. The method for preparing polymeric organoboron compounds of the recurring structural unit

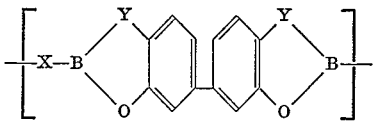

said units being linked through boron-carbon bonds of which said carbon atom is a nuclear carbon of a phenylene radical, where X is a radical selected from the group consisting of 1,3-phenylene and 1,4-phenylene and Y is selected from the group consisting of imino and oxygen radicals which comprises heating under reflux a material selected from the group consisting of 4,4'-diamino-3,3'-dihydroxydiphenyl and 3,4,3',4'-tetrahydroxydiphenyl with a material selected from the group consisting of 1,3-phenyldiboronic acid esters and 1,4-phenyldiboronic acid esters in the presence of an inert heat transfer medium, removing the alcohol produced in the reaction, and separating the polymeric organoboron compound from the residual mass.

8. The method for preparing polymeric organoboron compounds of the recurring structural unit

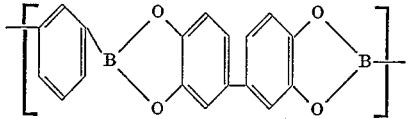

said units being linked through boron-carbon bonds of which said carbon atom is a nuclear carbon of a phenylene radical, which comprises heating under reflux 3,4,3',4'-tetrahydroxydiphenyl with a 1,3-phenyldiboronic acid ester in the presence of an inert heat transfer medium, removing the alcohol produced in the reaction by distillation, and separating the polymeric organoboron compound from the residual mass.

9. The method for preparing polymeric organoboron compounds of the recurring structural unit

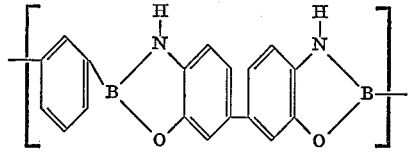

said units being linked through boron-carbon bonds of which said carbon atom is a nuclear carbon of a phenylene radical, which comprises heating under reflux 4,4'-diamino-3,3'-dihydroxydiphenyl with a 1,3-phenyldiboronic acid ester in the presence of an inert heat transfer medium, removing the alcohol produced in the reaction by distillation and separating the polymeric organoboron compound from the residual mass.

10. The method for preparing polymeric organoboron compounds of the recurring structural unit

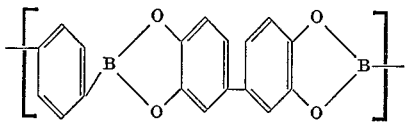

said units being linked through boron-carbon bonds of which said carbon atom is a nuclear carbon of a phenylene radical, which comprises heating under reflux 3,4,3',4'-tetrahydroxydiphenyl with a 1,4-phenyldiboronic acid ester in the presence of an inert heat transfer medium, removing the alcohol produced in the reaction by distillation, and separating the polymeric organoboron compound from the residual mass.

11. The method for preparing polymeric organoboron compounds of the recurring structural unit

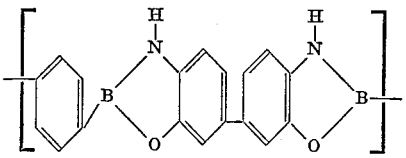

said units being linked through boron-carbon bonds of which said carbon atom is a nuclear carbon of a phenylene radical, which comprises heating under reflux 4,4'-diamino-3,3'-dihydroxydiphenyl with a 1,4-phenyldiboronic acid ester in the presence of an inert heat transfer medium, removing the alcohol produced in the reaction by distillation and separating the polymeric organoboron compound from the residual mass.

12. The method for preparing polymeric organoboron compounds of the recurring structural unit

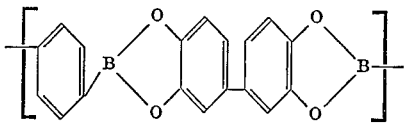

said units being linked through boron-carbon bonds of which said carbon atom is a nuclear carbon of a phenylene radical, which comprises heating 3,4,3',4'-tetrahydroxydiphenyl with a 1,4-phenyldiboronic acid ester and removing the alcohol produced in the reaction.

References Cited by the Examiner

UNITED STATES PATENTS 3,045,038   7/62   Brotherton et al. _____ 260—462

OTHER REFERENCES

Marvel et al.: "High Polymeric Materials," Wadd Technical Report 61–12, pages 103–4, reproduced by the Armed Services Technical Information Agency, Arlington 12, Va., April 1961.

WILLIAM H. SHORT, *Primary Examiner.*

LOUISE P. QUAST, *Examiner.*